C. E. BRADDY.
GRAIN SEPARATOR.
APPLICATION FILED MAR. 27, 1919.
1,327,193.
Patented Jan. 6, 1920.
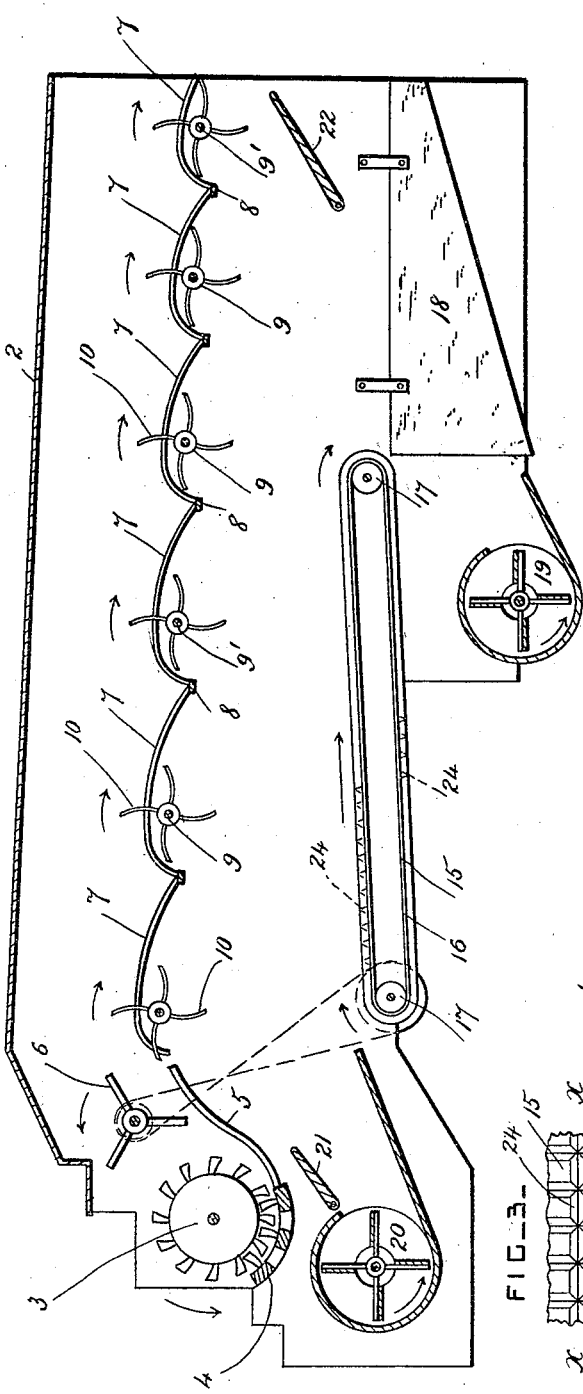
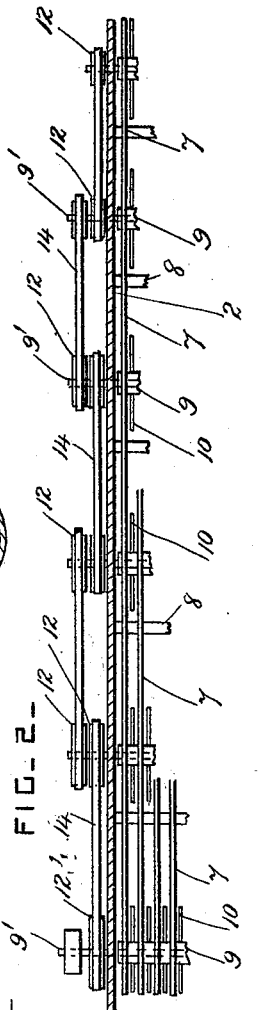
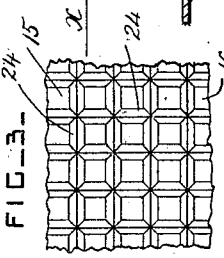
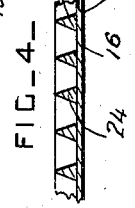
Inventor
Clyde E. Braddy
by Herbert W. Jenner
Attorney

UNITED STATES PATENT OFFICE.

CLYDE E. BRADDY, OF PINEBLUFF, WYOMING.

GRAIN-SEPARATOR.

1,327,193.  Specification of Letters Patent.  Patented Jan. 6, 1920.

Application filed March 27, 1919. Serial No. 285,425.

*To all whom it may concern:*

Be it known that I, CLYDE E. BRADDY, a citizen of the United States, residing at Pinebluff, in the county of Laramie and State of Wyoming, have invented certain new and useful Improvements in Grain-Separators, of which the following is a specification.

This invention relates to separators for grain, and it consists in the novel construction and combination of the parts hereinafter fully described and claimed whereby the grain is separated from the straw and chaff after they leave the threshing cylinder, and whereby the grain is conveyed separately to the cleaning mechanism.

In the drawings, Figure 1 is a longitudinal section through a grain separator constructed according to this invention. Fig. 2 is a plan view of a portion of the straw rack and some of the pickers, and shows also the means for revolving the pickers. Fig. 3 is a detail plan view of a portion of the conveyer apron. Fig. 4 is a cross-section of the conveyer apron, taken on the line $x$—$x$ in Fig. 3.

The separator is provided with an inclosing casing 2, and 3 is the toothed threshing cylinder journaled at the front end portion of the casing. A toothed concave 4 is arranged under the threshing cylinder, and is provided with an upwardly projecting grate 5 arranged at its rear end and formed of parallel bars. A beater 6 is journaled to the rear of the threshing cylinder over the upper part of the grain grate 5, and the cylinder and beater are revolved in the direction of the arrows adjacent to them by any approved means. All of the above mentioned parts are of any approved construction.

The straw is delivered by the beater onto a stationary straw rack formed of a series of upwardly curved grates 7 arranged end to end and supported in the upper part of the casing. These grates are all similar to each other, and each grate consists of a row of parallel bars having their ends secured to cross pieces 8. These bars are curved upwardly for their full length, and the grates are decreased in length progressively from the front end to the rear end of the straw rack.

Pickers 9 are journaled in the casing, and are arranged under the front end portions of the grates. Each picker is secured on a shaft $9'$, and has curved arms 10 which project through the front end portions of the grates, but not through their rear end portions, so that the straw is moved slowly in passing from one grate to another. The pickers at the front end portion of the straw rack are spaced farther apart than those at its rear end portion; and the pickers at the rear end portion are revolved faster than those at its front end portion. The last picker of the series is preferably revolved at twice the speed of the first picker in the series, and the intervening pickers are preferably revolved at proportionally increasing speeds from the first to the last of the series. Driving wheels 12 are secured on the picker shafts, and 14 are flexible driving devices which engage with the said wheels and revolve the pickers at the predetermined speeds. The front end portions of the grate bars 7 are formed on curves of a shorter radius than their rear end portions, and the lower part of the straw is checked slightly as it strikes against these front end portions so that the straw is turned over or rolled over as it passes over the rack but its continuity of travel is not interrupted. The straw is moved slowly and in larger masses at the front part of the rack, and is loosened up gradually and is moved with gradually increasing speed as it passes over the rack. As the bars decrease in length and the pickers are spaced nearer together, the straw is tossed upwardly with progressively increasing force or speed and with progressively increasing frequency.

Some straw will catch on the bars 8 and some will lodge in the angular spaces over the bars 8, but this straw will stay there indefinitely as it is out of the reach of the pickers, and it has no material effect in the working of the machine, the bulk of the straw being moved over such dead straw by the pickers.

An endless grain conveyer 15 is arranged under the front and middle portions of the straw rack, and its apron 16 passes over end rollers 17, and is driven continuously in the direction of the arrow adjacent to it. The rear end portion of the casing behind and below the conveyer is occupied by the grain cleaning mechanism 18, provided with a fan 19 which is arranged under the rear part of the conveyer. This cleaning mechanism and its fan are of any approved construction.

A blast fan 20 is arranged under the threshing cylinder and its concave at the front end portion of the casing, and it delivers a blast of air upwardly and rearwardly through the straw rack and between the conveyer and the straw rack.

An adjustable deflector 21 is pivoted in the casing under the grate 5 to direct more or less of the blast toward the front grate of the series forming the straw rack, as found desirable. A similar deflector 22 is pivoted in the casing to direct the blast upwardly to the last grate of the series.

The blast of air from the fan 20 drives all the chaff upwardly through the grates of the straw rack, and discharges it at the rear end of the casing, without letting the chaff fall on or rest on the grain conveyer. The pickers keep the straw on the straw rack in a loose condition so that the chaff is blown upwardly from the straw, and is prevented from becoming matted with the straw. The straw is moved faster by the pickers on the rear part of the straw rack, where the blast from the fan is weaker, so that the chaff may not settle on the straw. The fan 20 is made to deliver a strong blast of air, so that the chaff is driven out at the rear end of the machine by it, and no additional fan is required for that purpose, and the usual chaffer or shaking chaffer screen is dispensed with.

In order that the grain resting on the conveyer apron may not be blown rearwardly by the sharp blast of air from the fan 20 which passes over it, the surface of the apron is divided into rectangular pockets for the grain by means of ribs 24. These ribs are triangular in cross-section, and are formed of india rubber or other similar flexible material which will stretch and bend in passing over the conveyer rollers. The pockets for the grain are preferably about three inches square, but they may be of other shape and size as may be found to give good results.

The conveyer delivers the grain to the cleaning mechanism, in which weed seeds and other rubbish is separated from the good grain. The grain which is mixed with the straw on the straw rack falls through the grates of the straw rack onto the conveyer and the cleaning mechanism, and any chaff that falls through the straw rack with the grain is blown back again and is discharged with the straw at the rear end of the machine, the usual chaffer interposed between the straw rack and the cleaning mechanism being dispensed with, and the fan 19 of the cleaning mechanism being relieved of the work of blowing out the chaff at the rear of the machine. The grain which is driven through the grate 5 by the threshing cylinder is also exposed to the sharp blast of air from the fan 20, so that light rubbish is blown out of it, and the grain is deposited on the conveyer.

In machines as usually constructed the chaff is shaken through the straw by a shaking straw rack, and falls by gravity from the rack or racks with the grain, and is blown out of the grain by the cleaner fan at the chaffer, with the disadvantage that some of the grain is blown out with the chaff and wasted, and the cleaning mechanism has to remove some chaff from the grain.

What I claim is:

1. In a grain separator, a stationary straw rack formed of a series of grates arranged end to end, each grate comprising a series of bars curved upwardly and decreasing in length progressively from the front to the rear of the rack, and revoluble pickers journaled under the front end portions of the grates.

2. In a grain separator, a stationary straw rack formed of a series of grates arranged end to end and decreasing in length progressively from the front end to the rear end of the rack, each grate comprising a series of bars curved upwardly for their full length, revoluble pickers spaced at progressively decreasing distances apart to suit the said grates and journaled under their front end portions, and means for revolving the pickers at progressively increasing speeds from the front end to the rear end of the rack.

3. In a grain separator, a stationary straw rack formed of a series of grates arranged end to end, each grate comprising a series of bars curved upwardly and decreasing in length progressively from the front to the rear of the rack, revoluble pickers journaled under the front end portions of the grates, and means for revolving the pickers at different speeds to accelerate the travel of the straw over the shorter grates.

4. In a grain separator, a stationary and substantially horizontal straw rack extending from the threshing mechanism to the rear end of the machine, said rack being formed of longitudinal bars and provided with means for moving the straw rearwardly over it, an endless traveling grain conveyer arranged in a substantially horizontal position under the said straw rack, a blast fan arranged at the front end portion of the machine under the threshing mechanism and in front of the front ends of the said straw rack and grain conveyer and operating to force air through the space between the said straw rack and grain conveyer to remove the chaff, and a deflector for regulating the air current at the rear end portion of the machine to the rear of the said conveyer and under the rear end portion of the straw rack.

In testimony whereof I have affixed my signature.

CLYDE E. BRADDY.